United States Patent
Bollineni et al.

(10) Patent No.: US 12,429,843 B2
(45) Date of Patent: Sep. 30, 2025

(54) METHOD AND SYSTEM FOR PROVIDING ENGINEERING OF AN INDUSTRIAL DEVICE IN A CLOUD COMPUTING ENVIRONMENT

(71) Applicant: Siemens Aktiengesellschaft, Munich (DE)

(72) Inventors: Sudeepthi Bollineni, Karnataka (IN); Christian Fischer, Hersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 385 days.

(21) Appl. No.: 18/024,532

(22) PCT Filed: Sep. 9, 2021

(86) PCT No.: PCT/EP2021/074815
§ 371 (c)(1),
(2) Date: Mar. 3, 2023

(87) PCT Pub. No.: WO2022/058235
PCT Pub. Date: Mar. 24, 2022

(65) Prior Publication Data
US 2023/0315038 A1    Oct. 5, 2023

(30) Foreign Application Priority Data
Sep. 17, 2020 (EP) .................................. 20196662

(51) Int. Cl.
G05B 19/05 (2006.01)
G06F 8/60 (2018.01)

(52) U.S. Cl.
CPC ............. *G05B 19/056* (2013.01); *G06F 8/60* (2013.01); *G05B 2219/13144* (2013.01)

(58) Field of Classification Search
None
See application file for complete search history.

(56) References Cited

U.S. PATENT DOCUMENTS 6,104,962 A    8/2000 Sastry
2018/0052451 A1    2/2018 Billi-Duran et al.

FOREIGN PATENT DOCUMENTS

WO    2010060243 A1    6/2010

OTHER PUBLICATIONS

PCT International Search Report and Written Opinion of International Searching Authority mailed Dec. 1, 2021 corresponding to PCT International Application No. PCT/EP2021/074815 filed Sep. 9, 2021.

*Primary Examiner* — Sean Shechtman
(74) *Attorney, Agent, or Firm* — Schmeiser, Olsen & Watts, LLP (57) ABSTRACT

A method and system for managing engineering of an industrial device in a cloud computing environment is disclosed. The method includes receiving a request for performing an engineering action on at least one of the industrial devices. The method includes determining a control program block corresponding to the at least one of the industrial device based on the received request. Further, segmenting the determined control program block into one or more software units based on content of the control program block. Furthermore, processing the one or more software units based on one or more user requirements and the requested engineering action. Also, determining at least two instances of the industrial device for deploying the processed software units based on segment type of the processed software units. Moreover, deploying the respective software units into each of the determined at least two instances of the industrial device.

11 Claims, 5 Drawing Sheets

METHOD AND SYSTEM FOR PROVIDING ENGINEERING OF AN INDUSTRIAL DEVICE IN A CLOUD COMPUTING ENVIRONMENT

CROSS REFERENCE TO RELATED APPLICATIONS

The application claims priority to PCT Application No. PCT/EP2021/074815, having a filing date of Sep. 9, 2021, which claims priority to EP Application Serial No. 20196662.9, having a filing date of Sep. 17, 2020, the entire contents both of which are hereby incorporated by reference.

FIELD OF TECHNOLOGY

The present disclosure relates to engineering of industrial devices, and more particularly relates to a method and system for providing engineering of an industrial device in a cloud computing environment.

BACKGROUND

A factory or a plant typically hosts several programmable logic controllers (PLC). Each PLC controls a specific part of the factory or a specific machine. During initial commissioning phase, control programs such as PLC programs are written using an engineering application to meet specific control conditions of the factory. These PLC programs are compiled, tested, and deployed to specific PLC's in the factory.

Once the initial commissioning is completed, the PLC programs may need continuous changes or adaptations in order to meet the changing requirements of the factory. Also, each time when an issue arising in the factory needs to be fixed or if a process needs to be improved, the PLC program needs to be modified. Such a task of updating and deploying of PLC program often is a time-consuming. For example, when a PLC program needs to be modified, the PLC program or specific part of the PLC program is built and compiled with all relevant PLC programs. Later, automated tests are executed on those modified PLC programs, and the PLC program are downloaded on the desired PLC device. These leads to increased time and efforts spent on developing automation solutions. Further, the entire PLC program is downloaded on a single PLC, which consumes huge memory space. Hence, sharing execution load of the PLC programs in between a hardware and a software is challenging as there is always a huge dependency with hardware configuration and because of huge engineering efforts involved. Moreover, establishing direct communication link with a physical hardware and a simulated software always involve huge engineering efforts.

In light of above, there is a need for an improved method and system for providing engineering of an industrial device in a cloud computing environment.

SUMMARY

Therefore, an aspect relates to provide a method and system for providing engineering of an industrial device in a cloud computing environment.

An aspect relates to a method for providing engineering of an industrial device in a cloud computing environment. The method comprises receiving a request for performing an engineering action on at least one of the industrial devices. The method comprises determining a control program block corresponding to the at least one of the industrial devices based on the received request. In an exemplary embodiment, the control program block comprises a PLC program. The PLC program comprises multiple parts referred as function blocks. Each function block resides in a separate part file as part of the engineering project file.

The method comprises segmenting the determined control program block into one or more software units based on content of the control program block. The content of the control program block comprises device configuration information, device ID, device name and the like. Further, the method comprises processing the one or more software units based on one or more user requirements and the requested engineering action. Also, the method comprises determining at least two instances of the industrial devices for deploying the one or more processed software units separately based on segment type of the processed one or more software units. The at least two instances of the industrial devices comprise at least one virtual instance of the industrial device and at least one physical instance of the industrial device. Further, the method comprises deploying separately the respective one or more software units into each of the determined at least two instances of the industrial device.

The method comprises dynamically generating a modified control program based on the one or more modifications made in the control program. In an embodiment, the modified control program corresponds to a compiled PLC program. Additionally, the method comprises outputting the modified control program on a user interface of the at least one engineering system.

In determining the control program block corresponding to the at least one of the industrial devices based on the received request, the method comprises identifying the at least one of the industrial devices by parsing the received request. Further, the method comprises comparing the identified at least one of the industrial devices with one or more pre-stored instance of the industrial device. Each of the one or more pre-stored instance of the industrial device is correspondingly mapped to one or more control program blocks. Also, the method comprises determining the control program block corresponding to the identified at least one of the industrial devices based on the comparison.

In segmenting the determined control program block into one or more software units based on content of the control program block, the method comprises determining one or more properties associated with the control program block based on the content of the control program block. Further, the method comprises generating one or more software units associated with the control program block based on the determined one or more properties associated with the control program block. Also, the method comprises segmenting the determined control program block into the generated one or more software units. Each of the one or more software units comprises sub-control program blocks which are self-executable, self-configurable and self-deployable.

In processing the one or more software units based on one or more user requirements and the requested engineering action, the method comprises determining one or more parameters associated with the at least one of the industrial devices by parsing the engineering action. Further, the method comprises identifying a sub control program block of the one or more software units corresponding to the determined one or more parameters associated with the at least one of the industrial devices. The method comprises determining whether the sub control program block of the one or more software units require a modification based on the determined one or more parameters associated with the at least one of the industrial devices. Furthermore, the method comprises modifying the sub control program block of the one or more software units based on the determination.

In determining the at least two instances of the industrial device for deploying the one or more processed software units separately based on segment type of the processed one or more software units, the method comprises determining type of segment associated with each of the one or more processed software units. Further, the method comprises determining one or more properties associated with the determined type of segment associated with each of the one or more processed software units. Furthermore, the method comprises determining type of industrial device required for deploying the one or more processed software units based on the determined one or more properties. Also, the method comprises determining whether the type of industrial device is available for deploying the one or more processed software units based on the determined one or more properties. Furthermore, the method comprises identifying the at least two instances of the industrial device which are determined to be available for deploying the one or more processed software units.

Furthermore, the method comprises generating one or more virtual instances of the industrial device required for deploying the one or more processed software units if the type of industrial device required is unavailable.

In deploying separately, the respective one or more software units into each of the determined at least two instances of the industrial devices, the method comprises establishing a communication session with each of the determined at least two instances of the industrial device via a network. Further, the method comprises determining whether one of the at least two instances of the industrial device correspond to a physical instance of the industrial device installed on a technical installation. Also, the method comprises deploying separately the respective one or more software units into the physical instance of the industrial device installed on the technical installation if the one of the at least two instances of the industrial device correspond to a physical instance of the industrial device installed in a technical installation.

Furthermore, the method comprises determining whether one of the at least two instances of the industrial device correspond to a virtual instance of the industrial device simulated in a virtual environment. Further, the method comprises generating a virtual instance of the industrial device in the virtual environment if the one of the at least two instances of the industrial device correspond to the virtual instance of the industrial device. Further, the method comprises deploying the respective one or more software units into the virtual instance of the industrial device.

Further, the method comprises establishing a real time communication session between the at least two instances of the industrial device via a communication network. Furthermore, the method comprises communicating real time parameter values associated with each of the at least two virtual instances of the industrial device using the established communication session.

An aspect of embodiments of the present invention is achieved by an automation engineering management system. The automation engineering management system comprises one or more processor(s) and a memory coupled to the processor(s). The memory comprises an automation engineering management module stored in the form of machine-readable instructions executable by the processor(s). The automation engineering management module is configured for performing the method steps described above.

An aspect of embodiments of the present invention is achieved by a cloud computing system comprising a processing unit, and a cloud platform comprising an automation engineering management module stored therein in the form of machine-readable instructions executable by the processing unit. The automation engineering management module is configured to perform the method steps described above.

An aspect of embodiments of the present invention is achieved by a computer-program product (non-transitory computer readable storage medium having instructions which when executed by a processor, perform actions) having machine-readable instructions stored therein, that when executed by one or more processing unit(s), cause the one or more processing unit(s) to perform method steps described above.

The above-mentioned and other features of embodiments of the invention will now be addressed with reference to the accompanying drawings of the present disclosure. The illustrated embodiments are intended to illustrate, but not limit embodiments of the invention.

BRIEF DESCRIPTION

Some of the embodiments will be described in detail, which reference to the following figures, wherein like designations denote like members, wherein.

DETAILED DESCRIPTION

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

Throughout the specification, the terms "user devices" and "engineering systems" are used interchangeably.

Figure 1:
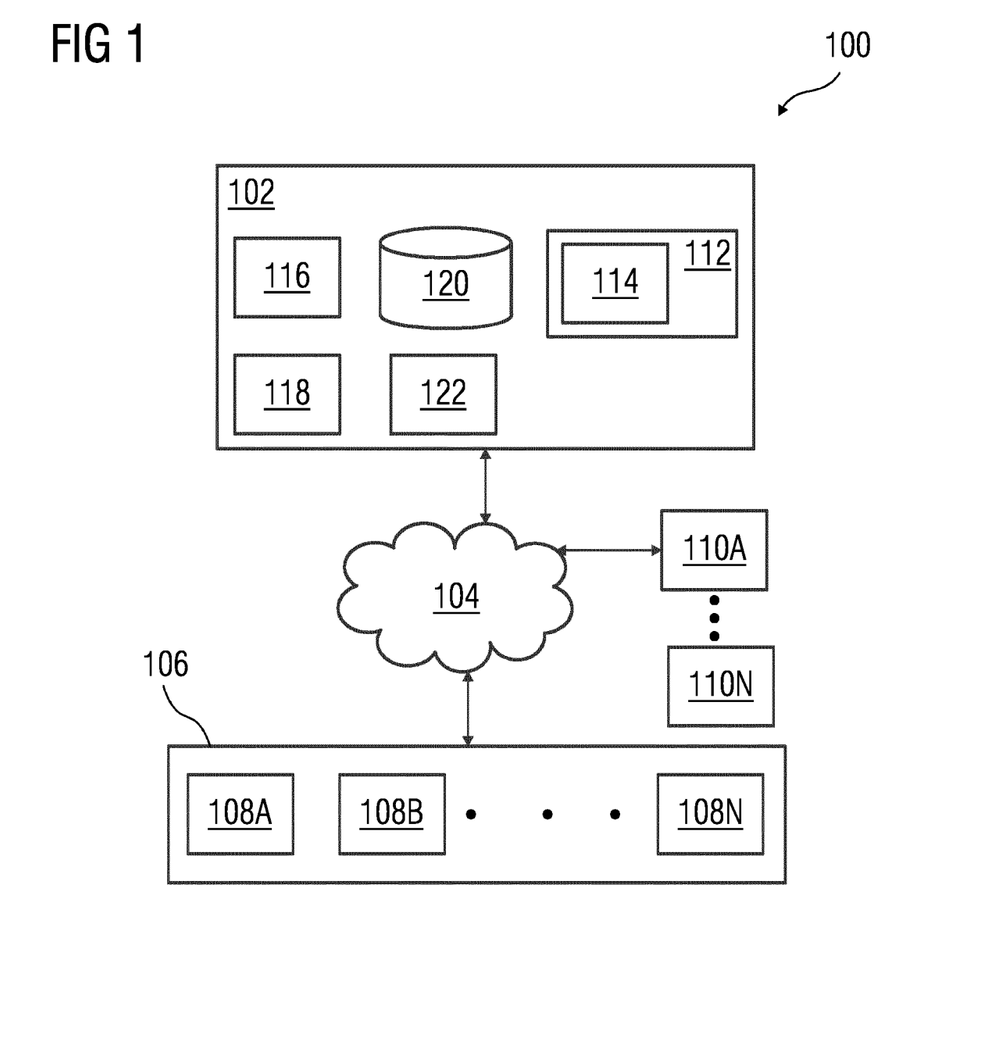
FIG. 1 is a schematic representation of a cloud computing environment capable of managing engineering of industrial devices, according to an embodiment of the present disclosure.

FIG. 1 is a schematic representation of a cloud computing environment 100 capable of managing engineering of industrial devices 108A-N, according to an embodiment of the present present disclosure. Particularly, FIG. 1 depicts a cloud computing system 102 capable of delivering cloud applications for managing a technical installation 106 comprising one or more industrial devices 108A-N. As used herein, "cloud computing environment" refers to a processing environment comprising configurable computing physical and logical resources, for example, networks, servers, storage, applications, services, etc., and data distributed over the cloud platform. The cloud computing environment 100 provides on-demand network access to a shared pool of the configurable computing physical and logical resources. In an embodiment, the technical installation 106 may comprise a plant or an industry.

The cloud computing system 102 is connected to the one or more industrial devices 108A-N in the technical installation 106 via a network 104 (e.g., Internet). The one or more industrial devices 108A-N may include robots, switches, automation devices such as programmable logic controllers (PLC) s, human machine interfaces (HMIs), field devices such as motors, valves, pumps, actuators, sensors, and other industrial device(s). In an exemplary embodiment, the one or more industrial devices 108A-N comprises a control device, such as the PLC. The cloud computing system 102 may be a public cloud, a private cloud, and/or a hybrid cloud configured to provide dedicated cloud services to its users. Although, FIG. 1 illustrates the cloud computing system 102 connected to one technical installation 106, one skilled in the art can envision that the cloud computing system 102 can be connected to several technical installations 106 located at different geographical locations via the network 104.

Further, the cloud computing system 102 is also connected to user devices 110A-N via the network 104. The user devices 110A-N can access the cloud computing system 102 for managing engineering of industrial devices 108A-N. In an embodiment, the user devices 110A-N comprises an engineering system capable of running an industrial automation application. The user devices 110A-N can be a laptop computer, desktop computer, tablet computer, smartphone and the like. The user devices 110A-N can access cloud applications (such as providing performance visualization of the one or more industrial devices 108A-N) via a web browser. Also, each of the user(s) using the user devices 110A-N is associated with a defined privilege for accessing the engineering project files. The defined privileges may include geographical location(s) of the user, role of the user, version of the industrial automation application, associated permissions and the like. The permissions may comprise read access, write access, read and write access, and read or write access.

The cloud computing system 102 comprises a cloud computing platform 112, an automation engineering management system 114, a cloud computing infrastructure 116 including hardware resources and an operating system (OS), a network interface 118 and a database 120. The network interface 118 enables communication between the cloud computing system 102, the technical installation 106, and the user devices 110A-N. Also, the network interface 118 enables communication between the cloud computing system 102 and the user devices 110A-N. The cloud interface (not shown in FIG. 1) may allow the users at the one or more user devices 110A-N to access one or more control programs stored at the cloud computing system 102 and perform one or more engineering actions on the control program blocks as same instance. The cloud computing infrastructure 116 may include one or more servers on which the OS is installed. The cloud computing infrastructure 116 may comprise one or more processors, one or more storage devices, such as, memory units, for storing data and machine-readable instructions for example, applications and application programming interfaces (APIs) 122, and other peripherals required for providing cloud computing functionality. The cloud computing platform 112 is a platform which enables functionalities such as data reception, data processing, data rendering, data communication, etc. using the hardware resources and the OS of the cloud computing infrastructure 116 and delivers the aforementioned cloud services using the application programming interfaces 122 deployed therein. The cloud computing platform 112 may comprise a combination of dedicated hardware and software built on top of the hardware and the OS.

The database 120 stores the information relating to the technical installation 106 and the user devices 110A-N. The database 120 is, for example, a structured query language (SQL) data store or a not only SQL (NoSQL) data store. The database 120 is configured as cloud-based database implemented in the cloud computing environment 100, where computing resources are delivered as a service over the cloud computing platform 112. The database 120, according to another embodiment of the present disclosure, is a location on a file system directly accessible by the control program management system 114. The database 120 is configured to store the one or more software units, one or more control program blocks, sub control program blocks, one or more parameters associated with the at least one of the industrial device 108A-N, one or more properties associated with the software units, virtual instances of the industrial devices 108A-N, real time values of the at least one of the industrial device 108A-N, communication session, types of segments, and the like.

Figure 2:
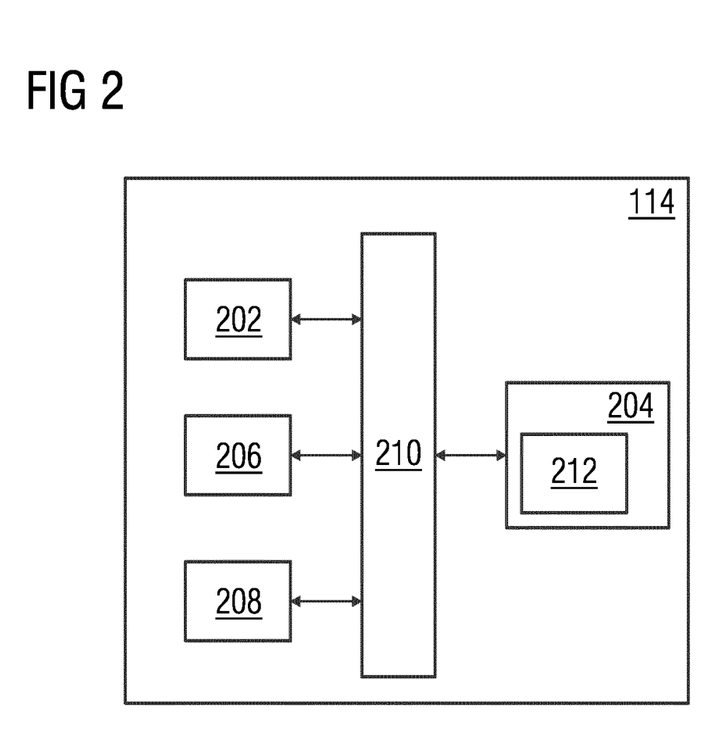
FIG. 2 is a block diagram of an automation engineering management system, such as shown in FIG. 1, in which an embodiment of the present disclosure can be implemented.

FIG. 2 is a block diagram of an automation engineering management system 114, such as those shown in FIG. 1, in which an embodiment of the present disclosure can be implemented. In FIG. 2, the automation engineering management system 114 includes a processor(s) 202, an accessible memory 204, a communication interface 206, an input-output unit 208, and a bus 210.

The processor(s) 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processor(s) 202, such as being a computer-readable storage medium. The processor(s) 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes an automation engineering management module 212 stored in the form of machine-readable instructions on any of the above-mentioned storage media and may be in communication with and executed by the processor(s) 202.

When executed by the processor(s) 202, the automation engineering management module 212 causes the processor(s) 202 to manage engineering of the industrial devices 108A-N in the cloud computing environment 100. In an embodiment, the automation engineering management module 212 causes the processor(s) 202 to receive a request for performing an engineering action on at least one of the industrial devices 108A-N. Upon receiving the request, the automation engineering management module 212 causes the processor(s) 202 to determine a control program block corresponding to the at least one of the industrial devices 108A-N based on the received request.

Further, the automation engineering management module 212 causes the processor(s) 202 to segment the determined control program block into one or more software units based on content of the control program block. Furthermore, the automation engineering management module 212 causes the processor(s) 202 to process the one or more software units based on one or more user requirements and the requested engineering action. Furthermore, the automation engineering management module 212 causes the processor(s) 202 to determine at least two instances of the industrial device for deploying the one or more processed software units separately based on segment type of the processed one or more software units. The at least two instances of the industrial device comprise at least one virtual instance of the industrial device and at least one physical instance of the industrial device. Additionally, the automation engineering management module 212 causes the processor(s) 202 to deploy separately the respective one or more software units into each of the determined at least two instances of the industrial device.

In determining the control program block corresponding to the at least one of the industrial devices 108A-N based on the received request, the automation engineering management module 212 causes the processor(s) 202 to identify the at least one of the industrial devices 108A-N by parsing the received request. Further, the automation engineering management module 212 causes the processor(s) 202 to compare the identified at least one of the industrial devices 108A-N with one or more pre-stored instances of the industrial device. Each of the one or more pre-stored instances of the industrial device is mapped to one or more corresponding control program blocks. Further, the automation engineering management module 212 causes the processor(s) 202 to determine the control program block corresponding to the identified at least one of the industrial devices 108A-N based on the comparison.

In segmenting the determined control program block into one or more software units based on content of the control program block, the automation engineering management module 212 causes the processor(s) 202 to determine one or more properties associated with the control program block based on the content of the control program block. Further, the automation engineering management module 212 causes the processor(s) 202 to generate one or more software units associated with the control program block based on the determined one or more properties associated with the control program block. Also, the automation engineering management module 212 causes the processor(s) 202 to segment the determined control program block into the generated one or more software units. Each of the one or more software units comprises sub-control program blocks which are self-executable, self-configurable and self-deployable.

In processing the one or more software units based on one or more user requirements and the requested engineering action, the automation engineering management module 212 causes the processor(s) 202 to determine one or more parameters associated with the at least one of the industrial devices 108A-N by parsing the engineering action. Further, the automation engineering management module 212 causes the processor(s) 202 to identify a sub control program block of the one or more software units corresponding to the determined one or more parameters associated with the at least one of the industrial devices 108A-N. Furthermore, the automation engineering management module 212 causes the processor(s) 202 to determine whether the sub control program block in the one or more software units require a modification based on the determined one or more parameters associated with the at least one of the industrial devices 108A-N. Further, the automation engineering management module 212 causes the processor(s) 202 to modify the sub control program block of the one or more software units based on the determination. The one or more modifications comprises changing parameter values, swapping control program blocks, rename software unit, classify control program block, addition, deletion, replace or remove one or more components of the control program block and the like.

In determining the at least two instances of the industrial device for deploying the one or more processed software units separately based on segment type of the processed one or more software units, the automation engineering management module 212 causes the processor(s) 202 to determine type of segment associated with each of the one or more processed software units. Further, the automation engineering management module 212 causes the processor(s) 202 to determine one or more properties associated with the determined type of segment associated with each of the one or more processed software units. Furthermore, the automation engineering management module 212 causes the processor(s) 202 to determine type of at least one of the industrial devices 108A-N required for deploying the one or more processed software units based on the determined one or more properties. Also, the automation engineering management module 212 causes the processor(s) 202 to determine whether the type of industrial device is available for deploying the one or more processed software units based on the determined one or more properties. Also, the automation engineering management module 212 causes the processor(s) 202 to identify the at least two instances of the industrial device which are determined to be available for deploying the one or more processed software units.

Furthermore, the automation engineering management module 212 causes the processor(s) 202 to generate one or more virtual instance of the industrial device required for deploying the one or more processed software units if the determined type of industrial device is unavailable.

In deploying separately, the respective one or more software units into each of the determined at least two instances of the industrial device, the automation engineering management module 212 causes the processor(s) 202 to establish a communication session with each of the determined at least two instances of the industrial device via a network. Further, the automation engineering management module 212 causes the processor(s) 202 to determine whether one of the at least two instances of the industrial device correspond to a physical instance of the industrial device 108A-N installed in a technical installation 106. Further, the automation engineering management module 212 causes the processor(s) 202 to deploy separately the respective one or more software units into the physical instance of the industrial device installed in the technical installation 106 if the one of the at least two instances of the industrial device correspond to the physical instance of the industrial device in the technical installation 106. Alternatively, the automation engineering management module 212 causes the processor(s) 202 to determine whether one of the at least two instances of the industrial device correspond to a virtual instance of the industrial device simulated in a virtual environment. In this case, the automation engineering management module 212 causes the processor(s) 202 to generate a virtual instance of the industrial device in the virtual environment if the one of the at least two instances of the industrial device correspond to the virtual instance of the industrial device. Further, the automation engineering management module 212 causes the processor(s) 202 to deploy separately the respective one or more software units into the virtual instance of the industrial device.

Furthermore, the automation engineering management module 212 causes the processor(s) 202 to establish a real-time communication session between the at least two instances of the industrial device via a communication network 104. Further, the automation engineering management module 212 causes the processor(s) 202 to communicate real-time parameter values associated with each of the at least two instances of the industrial device using the established communication session.

The communication interface 206 is configured for establishing communication sessions between the one or more engineering systems 110A-N and the cloud computing system 102. The communication interface 206 allows the one or more engineering applications running on the user devices 110A-N to import/import software units into the cloud computing system 102. In an embodiment, the communication interface 206 interacts with the interface at the one or more user devices 110A-N for allowing the engineers to access the control programs in the engineering project file and perform one or more engineering actions on the control program stored in the cloud computing system 102. The engineering actions may be those which are known to a person skilled in the art.

The input-output unit 208 may include input devices a keypad, touch-sensitive display, camera (such as a camera receiving gesture-based inputs), etc. capable of receiving one or more input signals, such as user commands to process an engineering project file. Also, the input-output unit 208 may be a display unit for displaying a graphical user interface which visualizes the behavior model associated with the software unite and also displays the status information associated with each set of engineering actions performed on the software units. The set of actions may include execution of predefined tests, download, compile and deploy of control programs. The bus 210 acts as interconnect between the processor 202, the memory 204, and the input-output unit 208.

Those of ordinary skilled in the art will appreciate that the hardware depicted in FIG. 2 may vary for particular implementation. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a cloud computing system 102 as is unique to the present disclosure or necessary for an understanding of the present disclosure is depicted and described. The remainder of the construction and operation of the cloud computing system 102 may conform to any of the various current implementation and practices known in the art.

Figure 3:
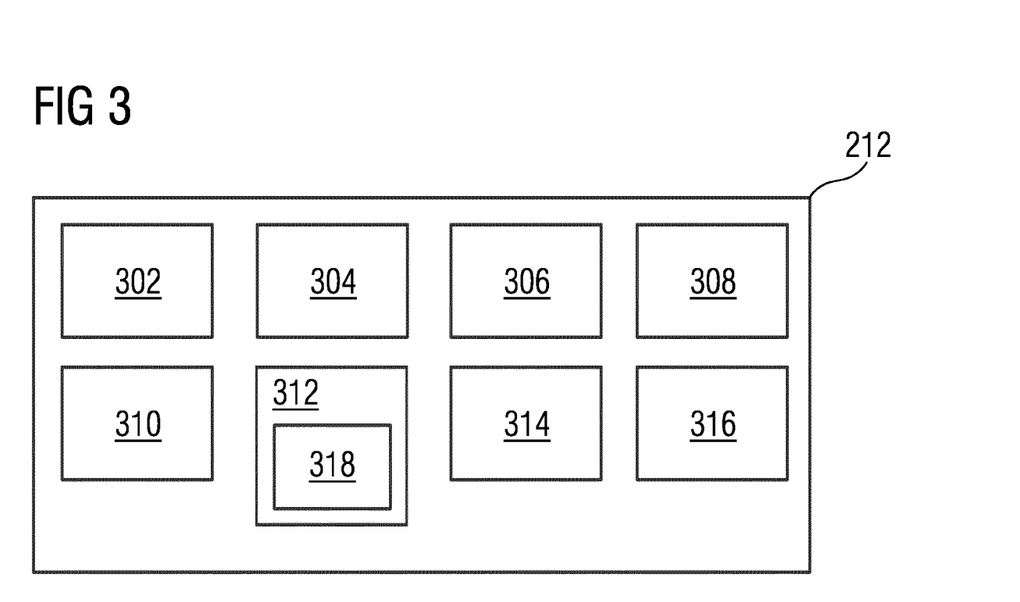
FIG. 3 is a block diagram of an automation engineering management module, such as those shown in FIG. 2, in which an embodiment of the present disclosure can be implemented.

FIG. 3 is a block diagram of an automation engineering management module 212, such as those shown in FIG. 2, in which an embodiment of the present disclosure can be implemented. In FIG. 3, the automation engineering management module 212 comprises a request handler 302, a control program block management module 304, a segmentation module 306, a processing module 308, a deployment module 310, a virtual environment 312, a communication interface 314, and a database 316.

The request handler 302 is configured for receiving a request for performing an engineering action on at least one of the industrial devices 108A-N. The request comprises at least one of desired user requirements associated with the technical installation 106, one or more desired parameter values associated with at least one of the industrial devices 108A-N, a request to establish communication between a physical instance of the industrial device 108A and corresponding virtual instance of the industrial device. The engineering action comprises upgrading a firmware, changing hardware configuration, addition or deletion of any new industrial device, and the like. The industrial device 108A may be a PLC.

The control program block management module 304 is configured for determining a control program block corresponding to the at least one of the industrial devices 108A-N based on the received request. The control program block comprises program statements for controlling the operation and behavior of the at least one of the industrial devices 108A-N. Upon receiving the request, the control program block management module 304 is configured for identifying the at least one of the industrial devices 108A-N by parsing the received request. Further, the control program block management module 304 is configured for comparing the identified at least one of the industrial devices 108A-N with one or more pre-stored instances of the industrial device. Each of the one or more pre-stored instances of the industrial device is correspondingly mapped to one or more control program blocks. For example, instance of PLC A is mapped to PLC Control Block A, instance of PLC B is mapped to PLC control block B and so on.

Further, the control program block management module 304 is configured for determining the control program block corresponding to the identified at least one of the industrial devices 108A-N based on the comparison. For example, if the request comprises parameters related to PLC A, then corresponding control program A is determined.

The segmentation module 306 is configured for segmenting the determined control program block into one or more software units based on content of the control program block. Specifically, the segmentation module 306 is configured for determining one or more properties associated with the control program block based on the content of the control program block. The one or more properties associated with the control program block comprises program block type, program block identifier, and program block path, and the like.

Further, the segmentation module 306 is configured for generating one or more software units associated with the control program block based on the determined one or more properties associated with the control program block. Specifically, the segmentation module 306 modularizes the huge control program block into multiple downloadable entities to shift the runtime to a virtual simulator such as PLC Simulator (for example, PLCSIM Advanced) which in turn is shifted to the cloud computing system 102. A software unit is a group of multiple programming artifacts behind a unit interface for engineering as well as for runtime. Such software units are self-contained deployable, separately loadable 'assemblies' constituting a consistency capsule on basis of (lockable) public interfaces.

Furthermore, the segmentation module 306 is configured for segmenting the determined control program block into the generated one or more software units. Each of the one or more software units comprises sub-control program blocks which are self-executable, self-configurable and self-deployable. In an embodiment, such software units are generated as a complied clean PLC program, where the logic of execution of the PLC program in real plant is segmented into two sections with multiple sub-units. For example, one segment comprises control program blocks and sub control program blocks which majorly performs pre-calculations, and which does not have much influence on real input or output (I/O) values of the at least one of the industrial devices 108A-N. This segment of control block is determined to be deployable on a virtual software comprising virtual instance of the industrial device 318. Another segment comprises control program blocks and sub control program blocks which mainly focuses on executions or program logic which have an influence on the real NO values of the at least one of the industrial devices 108A-N. The output of segmentation module 306 comprises one or more segments of the control program block.

The processing module 308 is configured for processing the one or more software units based on one or more user requirements and the requested engineering action. The one or more user requirements comprises changes to hardware configuration parameters of the at least one of the industrial devices 108A-N. Specifically, the processing module 308 is configured for determining one or more parameters associated with the at least one of the industrial devices by parsing the engineering action. The one or more parameters associated with the at least one of the industrial devices 108A-N comprises hardware configuration parameters, tag values, real time input output values of the at least one of the industrial devices 108A-N and any other known field parameters. Further, the processing module 308 is configured for identifying a sub control program block of the one or more software units corresponding to the determined one or more parameters associated with the at least one of the industrial devices 108A-N. For example, if the determined one or more parameters corresponds to PLC 1 tag values, then corresponding sub control program, say sub program PLC 1 tag values is identified.

Furthermore, the processing module 308 is configured for determining whether the sub control program block of the one or more software units require a modification based on the determined one or more parameters associated with the at least one industrial device. For example, the one or more parameters present in the identified sub control program are compared with those of the one or more determined parameters. If it is determined that the determined parameters are not same as that of the one or more parameters in the identified sub control program, then it is determined that the identified sub control program requires a modification. Subsequently, the processing module 308 is configured for modifying the sub control program block of the one or more software units based on the determination.

The deployment module 310 is configured for determining at least two instances of the industrial devices for deploying the one or more processed software units separately based on segment type of the processed one or more software units. The at least two instances of the industrial device comprise at least one virtual instance 318 of the industrial device and at least one physical instance of the industrial device. The deployment module 310 is also configured for deploying separately the respective one or more software units into each of the determined at least two instances of the industrial device. Specifically, the deployment module 310 is configured for determining type of segment associated with each of the one or more processed software units. For example, the type of segment comprises control program blocks executable on virtual instance 318 of the industrial device and the other comprises control program blocks executable on a real time hardware or physical instance of the industrial device (such as the industrial device 108A). Further, the deployment module 310 is configured for determining one or more properties associated with the determined type of segment associated with each of the one or more processed software units. The one or more properties of the type of segment comprises software based, hardware based, undeployable and the like. The software-based segment indicates that the software units comprising control program blocks are deployable on a virtual instance 318 of the industrial device. The hardware-based segment indicates that the software units comprising control program blocks are deployable on a real time hardware or physical instance of the industrial device (such as the industrial device 108A). The undeployable segment comprises software units which are not ready for deployment.

Further, the deployment module 310 is configured for determining type of industrial device required for deploying the one or more processed software units based on the determined one or more properties. The type of industrial device comprises a virtual instance 318 of the industrial device or a physical instance of industrial device. Further, the deployment module 310 is configured for determining whether such type of industrial device required is available for deploying the one or more processed software units based on the determined one or more properties. This is achieved by sending a test signal to all the industrial devices 108A-N currently deployed in the technical installation 106 and those present in the virtual environment. Later, the deployment module 310 is configured for identifying the at least two instances of the industrial device which are determined to be available for deploying the one or more processed software units. For example, any of the one combination among one virtual-one real hardware, two virtual, two real hardware may be selected for deployment. Such combination allows for executing the modularized or segmented control programs in different runtime target industrial device where one being in virtual environment. Also, such shared deployment helps in saving huge memory space and engineering efforts at the real time hardware industrial device.

In an embodiment, if it is determined that such type of industrial device required is unavailable, then the deployment module 310 generates one or more virtual industrial device required for deploying the one or more processed software units.

Further, the communication interface 314 is configured for establishing a communication session with each of the determined at least two instances of the industrial devices via a network 104. The communication session is established between for example a virtual PLC such as PLCSIM and PLC real hardware for both data exchange and for controlling the execution of control program block from one target (i.e., PLC real hardware) to another target (i.e., PLCSIM). Hence, such automatically established communication sessions reduces significant amount of engineering efforts with the help of these software units. This is achieved by connecting the at least one engineering system 110A-N to the cloud computing system 102. A unit connector is used to enable a user at the user devices 110A-N to connect to cloud computing infrastructure through his own account. Further, the communication between the virtual instance 318 of the industrial device and the physical instance of the industrial device 108A is established via standard mechanisms such as Open Platform Communications United Architecture (OPC-UA) or Transmission Control Protocol/Internet Protocol, (TCP/IP) to exchange the information between the software units which are downloaded to the virtual instance of the industrial device 318 which is in the cloud computing system 102 to the software units which are getting executed in the physical industrial device 108A.

Further, the deployment module 310 is configured for determining whether one of the at least two instances of the industrial device correspond to a physical instance of the industrial device 108A installed in a technical installation 106. Further, the deployment module 310 is configured for deploying separately the respective one or more software units into the physical instance of the industrial device 108A installed in the technical installation 106 if the one of the at least two instances of the industrial device corresponds to a physical instance of the industrial device 108A installed in the technical installation 106.

Further, the deployment module 310 is configured for determining whether one of the at least two instances of the industrial device corresponds to a virtual instance of the industrial device 318 simulated on a virtual environment.

In this case, the virtual environment 312 is configured for generating a virtual instance 318 of the industrial device in the virtual environment if the one of the at least two instances of the industrial device corresponds to the virtual instance 318 of the industrial device. Further, the virtual environment 312 is configured for deploying separately the respective one or more software units into the virtual instance 318 of the industrial device. The virtual instance 318 of the industrial device is hosted/lifted to the cloud computing system 102 using standard engineering software or any other automation software so that applications created using IECPL PLC programming language are executed in the cloud computing system 102. The virtual environment 312 is configured for simulating behavior of the control program in a simulation environment on one or more simulation instance associated with the virtual instance 318 of the industrial device.

In an embodiment, the virtual environment 312 comprises one or more virtual instances 318 of the industrial device. The virtual environment 312 emulates an actual technical installation, such as technical installation 106. Similarly, the virtual instance 318 of the industrial device in the virtual environment 312 emulates the actual industrial device(s) 108A-N. In an exemplary environment, the virtual instance 318 of the industrial device(s) may correspond to robots, switches, automation devices, programmable logic controllers (PLC) s, human machine interfaces (HMIs), motors, valves, pumps, actuators, sensors and other industrial devices. In an exemplary embodiment, the virtual instance 318 of the industrial device comprises a control device, such as the PLCs. Further, the virtual environment 312 may be a virtual setup of the actual technical installation 106.

The communication interface 314 is configured for establishing a real time communication session between the at least two instances of the industrial device via a communication network 104. Further, the communication interface 314 is configured for communicating real time parameter values associated with each of the at least two instances of the industrial device using the established communication session.

The database 316 is configured for storing the one or more software units, one or more control program blocks, sub control program blocks, one or more parameters associated with the at least one of the industrial devices 108A-N, one or more properties associated with the software units, virtual instance 318 of the industrial device, real time values of the at least one of the industrial devices 108A-N, communication session, types of segments, and the like.

Figure 4:
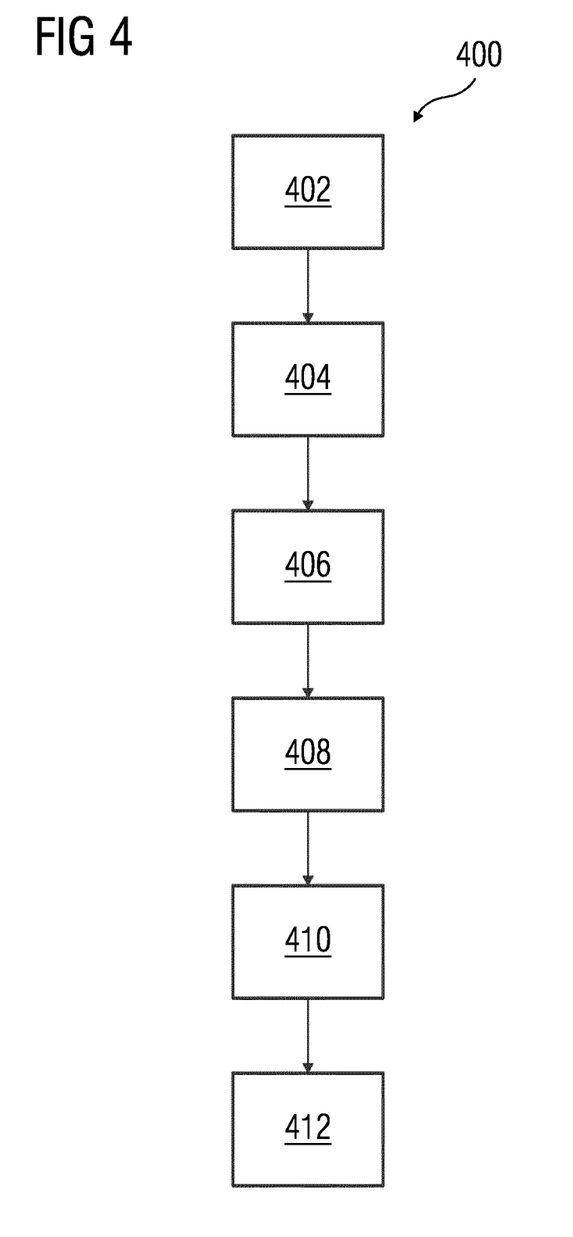
FIG. 4 is a process flowchart illustrating an exemplary method of managing engineering of industrial devices, according to an embodiment of the present disclosure.

FIG. 4 is a process flowchart 400 illustrating an exemplary method of managing engineering of the industrial devices 108A-N, according to an embodiment of the present disclosure. At step 402, a request for performing an engineering action on at least one of the industrial devices 108A-N is received. At step 404, a control program block corresponding to the at least one of the industrial devices 108A-N based on the received request is determined. At step 406, the determined control program block is segmented into one or more software units based on content of the control program block. At step 408, the one or more software units are processed based on one or more user requirements and the requested engineering action. At step 410, at least two instances of the industrial devices are determined for deploying the one or more processed software units separately based on segment type of the processed one or more software units. At step 412, the respective one or more software units are separately deployed into each of the determined at least two instances of the industrial device.

Figure 5:
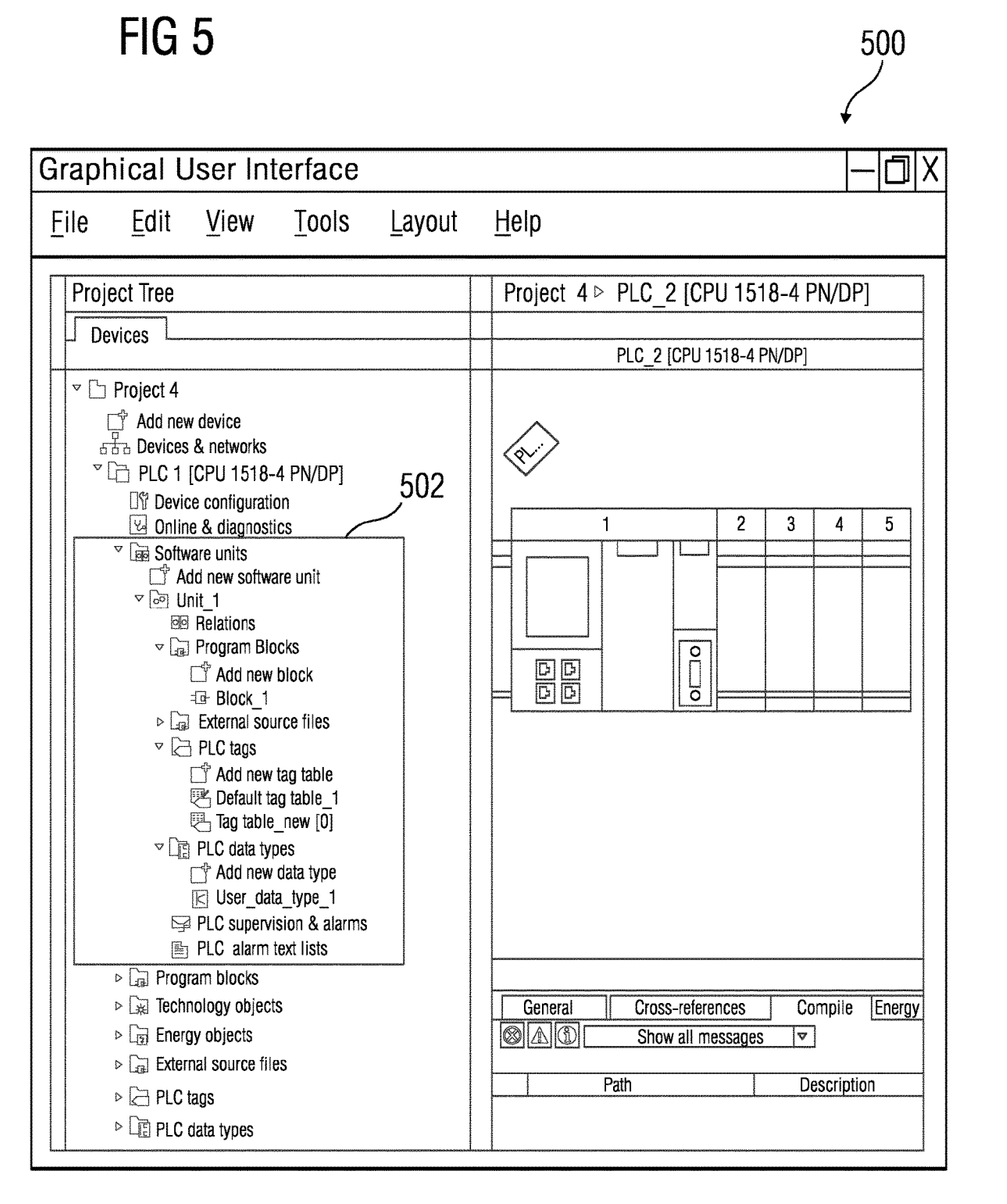
FIG. 5 is an exemplary schematic representation of a graphical user interface of an engineering application in an engineering system depicting management of engineering process, according to an embodiment of the present disclosure.

FIG. 5 is an exemplary schematic representation of a graphical user interface 500 of an automation application in a user device 110 for management of engineering process, according to an embodiment of the present disclosure. Specifically, FIG. 5 depicts a graphical user interface of the automation engineering management system 114 comprising one or more engineering projects associated with the technical installation 106. Each of the engineering project comprise a unique name and a unique identifier (ID) associated with it. Further, each engineering project comprises one or more control programs associated with industrial devices 108A-N. Each of such control programs comprises a common part control program and a dependent part control program. A common part control program has a unique ID and unique name associated with it. A dependent part control program also has a unique name and unique ID associated with it. In FIG. 5, the engineering project files such as Project 1 and Project 2 comprises control program such as a PLC program. Each PLC program comprises dependent control programs such as Motor logic, Conveyer Logic and so on. These dependent control programs are the function blocks. The dependent control programs have corresponding library of elements stored in the database 120 such as those shown in FIG. 5.

Each of these engineering project files along with the control programs are stored in the database 120. Further, any modifications done to the basic template of engineering project can be updated any time by users with the specific privileges. A typical user who wants to write some PLC program in a specific PLC project, first fetches the corresponding project. The automation engineering management system 114 identifies the corresponding PLC program. Then, such PLC program is segmented into one or more respective software units such as 502. Each of these software units comprises sub program blocks allowing the users to write specific PLC program parts. Once the compilation of the respective software units is locally successful and user has tested the software unit locally on the engineering system 110A-N, the automation engineering management system 114 determines suitable industrial device required for deploying each of the software units. For example, if there are four software units, the automation engineering management system 114 determines which of those four software units are to be deployed on real PLC and which software units are to be deployed on virtual PLC. For example, software units 1 and 2 are determined to be deployable over virtual PLC and software units 3 and 4 are determined to be deployable over real PLC. In this case, the automation engineering management system 114 allows for respective deployment of the software units into each virtual and real PLCs based on determination.

The present disclosure can take a form of a computer program product comprising program modules accessible from computer-usable or computer-readable medium storing program code for use by or in connection with one or more computers, processors, or instruction execution system. For the purpose of this description, a computer-usable or computer-readable medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology can be centralized or distributed (or a combination thereof) as known to those skilled in the art.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for managing engineering of industrial devices in a cloud computing environment, comprising:
 receiving, by a processor, a request for performing an engineering action on at least one of the industrial devices;
 determining, by the processor, a control program block corresponding to the at least one of the industrial devices based on the received request;
 segmenting, by the processor, the determined control program block into one or more software units based on content of the control program block;
 processing, by the processor, the one or more software units based on one or more user requirements and the requested engineering action;
 determining, by the processor, at least two instances of the at least one of the industrial devices for deploying the one or more processed software units separately based on segment type of the processed one or more software units; and
 deploying, by the processor, the respective one or more software units into each of the determined at least two instances of the at least one of the industrial devices;
 wherein determining the at least one two instances of the at least one of the industrial devices for deploying the one or more processed software units based on segment type of the processed one or more software units comprises:
  determining a type of segment associated with each of the one or more processed software units;
  determining one or more properties associated with the determined type of segment associated with each of the one or more processed software units;
  determining type of industrial device required for deploying the one or more processed software units based on the determined one or more properties;
  determining whether the determined type of industrial device is available for deploying the one or more processed software units based on the determined one or more properties; and
  identifying the at least two instances of the at least one of the industrial devices which are determined to be available for deploying the one or more processed software units, wherein at least one of the at least two instances of the at least one industrial device is at least one physical instance of the industrial device; and
  controlling, via a network, the execution of the software units of the control program block from at least one of the at least two instances of the at least one industrial device to the at least one physical instance of the industrial device.

2. The method according to claim 1, wherein the at least two instances of the industrial device comprises at least one virtual instance of the industrial device and at least one physical instance of the industrial device.

3. The method according to claim 2, wherein determining the control program block corresponding to the at least one of the industrial devices based on the received request comprises:
 identifying the at least one of the industrial devices by parsing the received request;
 comparing the identified at least of the industrial devices with one or more pre-stored instances of the industrial device, wherein each of the one or more pre-stored instances of the industrial device is correspondingly mapped to one or more control program blocks; and
 determining the control program block corresponding to the identified at least one of the industrial devices based on the comparison.

4. The method according to claim 3, wherein segmenting the determined control program block into one or more software units based on content of the control program block comprises:
 determining one or more properties associated with the control program block based on the content of the control program block;
 generating one or more software units associated with the control program block based on the determined one or more properties associated with the control program block; and
 segmenting the determined control program block into the generated one or more software units.

5. The method according to claim 4, wherein processing the one or more software units based on one or more user requirements and the requested engineering action comprises:
   determining one or more parameters associated with the at least one of the industrial devices by parsing the engineering action;
   identifying a sub control program block of the one or more software units corresponding to the determined one or more parameters associated with the at least one of the industrial devices;
   determining whether the sub control program block of the one or more software units require a modification based on the determined one or more parameters associated with the at least one of the industrial devices; and
   modifying the sub control program block of the one or more software units based on the determination.

6. The method according to claim 1, further comprising:
   generating one or more virtual instances of the industrial device required for deploying the one or more processed software units if the determined type of industrial device required is unavailable.

7. The method according to claim 6, wherein deploying the respective one or more software units into each of the determined at least two instances of the industrial device comprises:
   establishing a communication session with each of the determined at least two instances of the industrial device via a network;
   determining whether one of the at least two instances of the industrial device corresponds to a physical instance of the industrial device installed in a technical installation; and
   deploying the respective one or more software units into the physical instance of the industrial device installed in the technical installation if the one of the at least two instances of the industrial device corresponds to a physical instance of the industrial device installed in the technical installation.

8. The method according to claim 7, further comprising:
   determining whether one of the at least two instance of the industrial device corresponds to a virtual instance of the industrial device simulated in a virtual environment;
   generating the virtual instance of the industrial device in the virtual environment if the one of the at least two instances of the industrial device corresponds to the virtual instance of the industrial device; and
   deploying the respective one or more software units into the virtual instance of the industrial device.

9. The method according to claim 8, further comprising:
   establishing a real time communication session between the at least two instances of the industrial device via a communication network; and
   communicating real time parameter values associated with each of the at least two instances of the industrial device using the established communication session.

10. An automation engineering management system comprising:
   one or more processor(s); and
   a memory coupled to the one or more processor(s), wherein the memory comprises an automation engineering management module stored in the form of machine-readable instructions and executable by the one or more processor(s), wherein the automation engineering management module is configured to:
      receive a request for performing an engineering action on at least one of the industrial devices;
      determine a control program block corresponding to the at least one of the industrial devices based on the received request;
      segment the determined control program block into one or more software units based on content of the control program block;
      process the one or more software units based on one or more user requirements and the requested engineering action;
      determine at least two instances of the at least one of the industrial devices for deploying the one or more processed software units separately based on segment type of the processed one or more software units; and
      deploy the respective one or more software units into each of the determined at least two instances of the at least one of the industrial devices;
         wherein determining the at least one two instances of the at least one of the industrial devices for deploying the one or more processed software units based on segment type of the processed one or more software units comprises:
            determining a type of segment associated with each of the one or more processed software units;
            determining one or more properties associated with the determined type of segment associated with each of the one or more processed software units;
            determining type of industrial device required for deploying the one or more processed software units based on the determined one or more properties;
            determining whether the determined type of industrial device is available for deploying the one or more processed software units based on the determined one or more properties; and
            identifying the at least two instances of the at least one of the industrial devices which are determined to be available for deploying the one or more processed software unit, wherein at least one of the at least two instances of the at least one industrial device is at least one physical instance of the industrial device; and
            controlling, via a network, the execution of the software units of the control program block from at least one of the at least two instances of the at least one industrial device to the at least one physical instance of the industrial device.

11. A computer program product, comprising a non-transitory computer readable hardware storage device having computer readable program code stored therein, said program code executable by a processor of a computer system to implement a method, comprising machine-readable instructions stored therein, that when executed by one or more processors, cause the one or more processors to perform a method comprising:
   receiving, by the processor, a request for performing an engineering action on at least one of the industrial devices;
   determining, by the processor, a control program block corresponding to the at least one of the industrial devices based on the received request;
   segmenting, by the processor, the determined control program block into one or more software units based on content of the control program block;

processing, by the processor, the one or more software units based on one or more user requirements and the requested engineering action;

determining, by the processor, at least two instances of the at least one of the industrial devices for deploying the one or more processed software units separately based on segment type of the processed one or more software units; and deploying, by the processor, the respective one or more software units into each of the determined at least two instances of the at least one of the industrial devices, wherein determining the at least one two instances of the at least one of the industrial devices for deploying the one or more processed software units based on segment type of the processed one or more software units comprises:

determining a type of segment associated with each of the one or more processed software units;

determining one or more properties associated with the determined type of segment associated with each of the one or more processed software units;

determining type of industrial device required for deploying the one or more processed software units based on the determined one or more properties;

determining whether the determined type of industrial device is available for deploying the one or more processed software units based on the determined one or more properties; and         identifying the at least two instances of the at least one of the industrial devices which are determined to be available for deploying the one or more processed software units, wherein at least one of the at least two instances of the at least one industrial device is at least one physical instance of the industrial device; and     controlling, via a network, the execution of the software units of the control program block from at least one of the at least two instances of the at least one industrial device to the at least one physical instance of the industrial device.

\* \* \* \* \*